United States Patent [19]

Lange

[11] 4,374,609
[45] Feb. 22, 1983

[54] IMAGE PROJECTION SCREEN WITH DECREASED COLOR SHIFT AS A FUNCTION OF VIEWING ANGLE, AND METHOD OF MANUFACTURE

[75] Inventor: Howard G. Lange, Prospect Heights, Ill.

[73] Assignee: Zenith Radio Corporation, Glenview, Ill.

[21] Appl. No.: 265,938

[22] Filed: May 21, 1981

[51] Int. Cl.³ .................................................. G03B 21/60
[52] U.S. Cl. ................................................... 350/128
[58] Field of Search ................................ 350/122, 128

[56] References Cited

U.S. PATENT DOCUMENTS

| | | | |
|---|---|---|---|
| 3,791,712 | 2/1974 | Miyagi | 350/128 |
| 3,830,556 | 8/1974 | Bratkowski | 350/128 |
| 4,165,154 | 8/1979 | Takahashi | 350/128 |

*Primary Examiner*—Richard A. Wintercorn

[57] ABSTRACT

In order to reduce changes in color balance which occur as a function of viewing angle, a 3-color projection TV system having one axial and two off-axis image projectors employs a lenticular image screen having a plurality of vertical lenticules for horizontal light distribution, all of which have the same unique optical profile. This profile is derived by starting with a location-dependent shape appropriate for a location directly in line with an off-axis image projector, in order to obtain an asymmetric profile. The minor portion of the asymmetric profile is then discarded, and replaced by a mirror image of the major portion, thus producing a lenticule profile which is symmetrical but of too coarse a pitch. That oversized profile is then scaled down to the proper pitch, and duplicated all across the breadth of the screen. The resulting screen rotates the peak exit angle of the off-axis colors into a normal angle with the screen, producing a marked reduction in color imbalance as seen from off-axis viewing locations.

9 Claims, 8 Drawing Figures

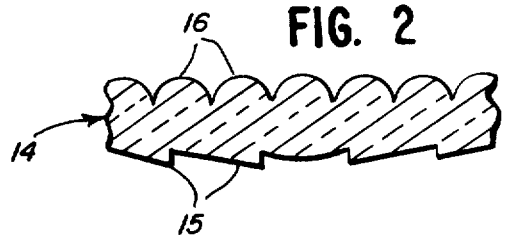
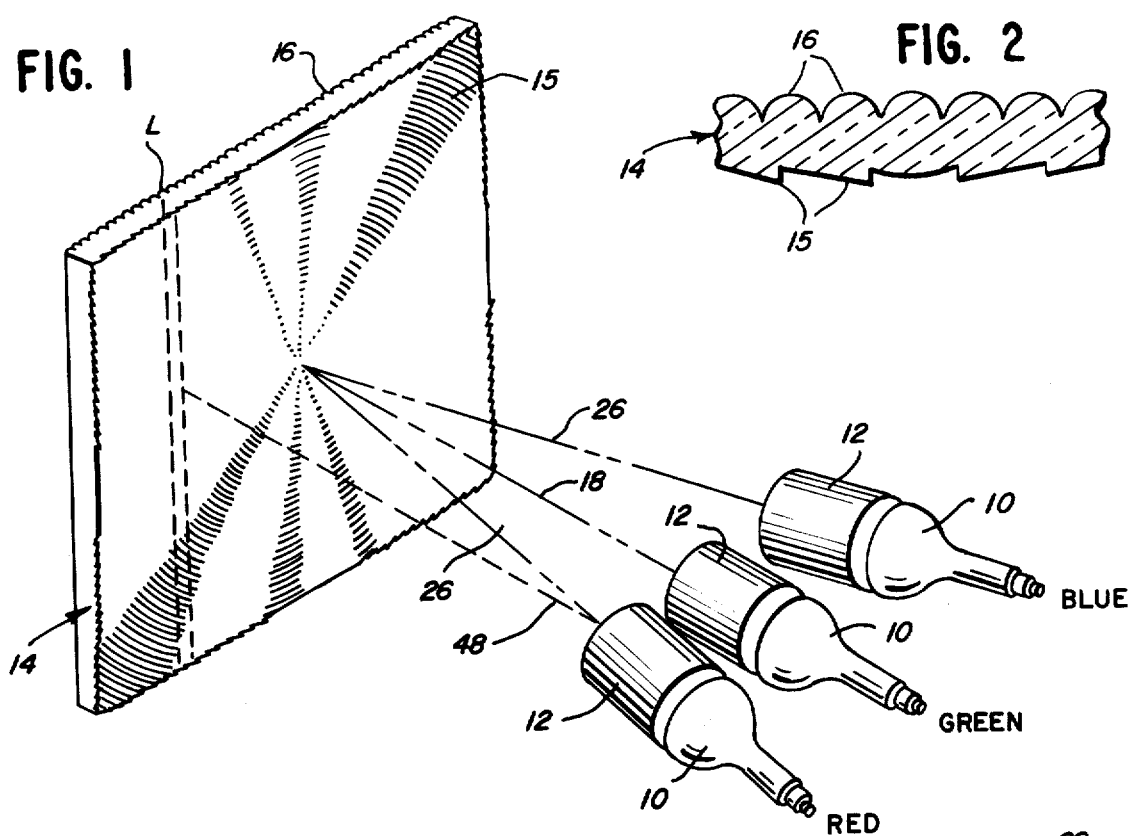
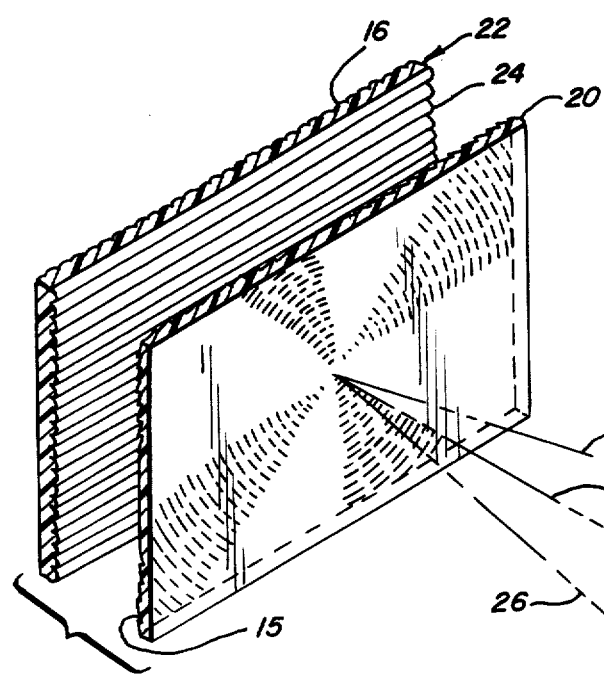
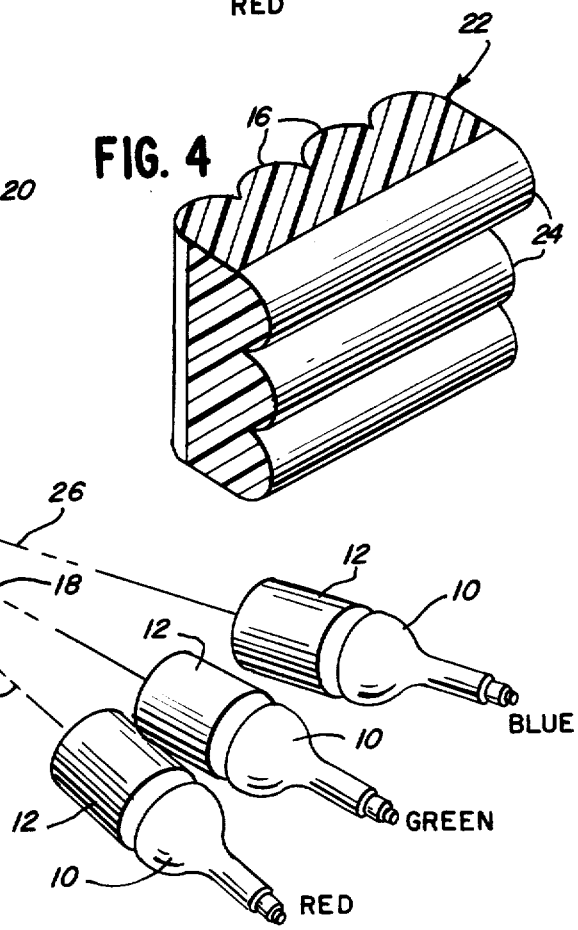

IMAGE PROJECTION SCREEN WITH DECREASED COLOR SHIFT AS A FUNCTION OF VIEWING ANGLE, AND METHOD OF MANUFACTURE

This invention relates generally to lenticular image projection screens, and in particular to those which are used in projection television systems.

BACKGROUND AND SUMMARY OF THE INVENTION

Projection television systems project enlarged cathode ray tube images upon remote screens. Color projection systems generally employ three picture tubes, one for each of the primary colors. In the conventional arrangement only one centrally located picture tube is aligned with the normal axis of the projection screen, and the other two are laterally displaced therefrom. This lateral displacement causes a number of problems, including color distortion.

The image light is horizontally distributed by vertical screen lenticules; and the brightness distribution varies as a function of horizontal viewing angle. Thus a viewer will see varying amounts of image light if he changes his seating location from side to center. Moreover these changes in image light levels are not identical for each of the three picture tubes because of their horizontal offset from each other. As the viewer changes his seating location the signal strength variations of the three tubes do not track each other.

Thus, different mixes of signal strengths are found at different viewing locations. Because each tube projects a different color, these different mixes are perceived as different color balances. Thus the lateral offset of the picture tubes causes the color balance to vary as a function of horizontal viewing angle. The present invention is directed at mitigating this change in color balance by rotating the peak values of the off-axis colors into a perpendicular attitude relative to the screen.

In copending patent application Ser. No. 222,836 entitled "Rear Projection Screen" and filed on Jan. 6, 1981 by the present inventor jointly with another, there is disclosed a procedure for developing the appropriate shape of a lenticule at any given screen location for compensating for image light reflection losses which vary as a function of the angle of incidence of the image light upon the lenticule. Since this angle of incidence varies as a function of screen location, in the copending patent application the lenticule profiles vary across the screen from center to edge.

In the present application a somewhat similar procedure is used as the first step in deriving the profile of a vertical lenticule. Thereafter the profile is revised and the final lenticule profile is then repeated horizontally across the screen. The resulting screen has novel light distribution properties, particularly with respect to the problem of horizontal color shift.

The invention will now be described in detail in connection with the following drawings.

BRIEF DESCRIPTION OF THE DRAWINGS

FIG. 1 is a perspective view of a three-color TV system incorporating a single-sheet lenticular projection screen having vertical lenticules for horizontal light distribution.

FIG. 2 is a fragmentary sectional view of the screen of FIG. 1, taken along a horizontal section plane, at the center of the screen.

FIG. 3 is a perspective view of a three-color TV system incorporating a two-sheet lenticular projection screen assembly. One of these sheets has vertical lenticules for horizontal light distribution.

FIG. 4 is an enlarged fragment of the screen of FIG. 3, broken away along horizontal and vertical planes to illustrate its lenticule configuration.

DETAILED DESCRIPTION OF THE PREFERRED EMBODIMENT

Figure 5:
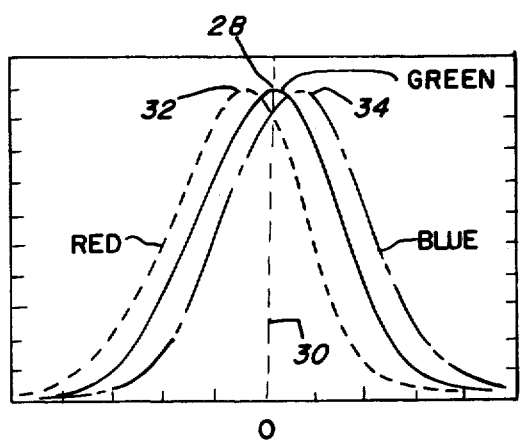
FIG. 5 is a plot of light brightness (ordinate) vs. horizontal viewing angle (abscissa) for all three colors when a lenticular viewing screen of the type illustrated in FIGS. 1 and 2 or the type illustrated in FIGS. 3 and 4 is employed, in which the vertical lenticule profiles are designed in accordance with the prior art.

A lenticular projection screen may be constructed in various configurations, including single sheet and double sheet configurations. The single sheet approach is illustrated in FIGS. 1 and 2. Three cathode ray tubes 10 have red, green and blue phosphors respectively on their pictures screens. These are the three primary color picture tubes of a conventional three-color projection television system. The green picture tube 10 is located centrally, and the red and blue picture tubes 10 are located on opposite sides of the green picture tube.

Each picture tube is provided with a respective focusing lens assembly 12. These serve to project the three primary color images upon a common projection screen 14. The screen consists of a single sheet of plastic having lenticular lenses 15 and 16 molded upon its rear and front surfaces respectively. The rear lenticular lens array 15 may be a conventional Fresnel field lens, for example of circular configuration, for redirecting or collimating the image light. The front surface lenticular array 16 includes a plurality of vertically running lenticules each having an optical profile designed to distribute the image light over a horizontal range of viewing angles to viewers who are located on the opposite side of sheet 14 from the picture tubes 10.

The image light must also be distributed over a somewhat smaller range of vertical viewing angles. In order to accomplish this in a single sheet screen design, there are a number of alternative design approaches. Either the front surface of the sheet 14, i.e. the surfaces of the lenticules 16, can be roughened so as to act as a surface diffuser to spread light through a small vertical viewing angle; or light-scattering particles can be imbedded within the bulk of the sheet 14 so as to perform the same diffusion function.

Each of the picture tubes 10 together with its focusing lens assembly 12 constitutes an image projector which projects an image of a particular primary color upon the rear surface of the screen 14, and the combination of colored images is seen by viewers on the front side of the screen who are located over a range of horizontal viewing angles, and whose head heights are distributed over a range of vertical viewing angles as well.

The centrally located green image projector 10, 12 has an optical axis 18 which coincides with the normal axis of the screen 14. Since only one of the image projectors can occupy this central position, the red and blue image projectors 10, 12 must necessarily be offset in some direction from the screen normal axis 18. The conventional arrangement, as illustrated, is for these to be horizontally displaced on opposite sides of the green projector. It is this horizontal offset of the blue and red projectors which gives rise to the color balance problem.

In the somewhat idealized system illustrated, the green projector is directly aligned with the screen normal axis 18. In a real projection color TV system, that would not necessarily be the case. The image projectors might be located some distance above or below the horizontal center plane of the screen 14, and thus the image light might be directed at an upward or downward angle toward the screen. Or the optical paths of the projected images might be folded by mirrors on their way from the image projectors 10, 12 to the screen 14. Nevertheless, in any of the arrangements just mentioned, one of the image projectors 10, 12, for example the green projector, would be centrally located in the sense that its optical axis would be in the same vertical plane as the normal axis of the screen 14; and the other two image projectors 10, 12, for example the red and blue projectors, would be laterally offset from, and on opposite sides of, that vertical plane.

The alternate arrangement illustrated in FIGS. 3 and 4 is essentially similar to that just described, except that the image projection screen comprises two sheets of molded plastic 20 and 22 (shown in exploded relation). The forward sheet 22 has the same vertically running lenticules 16 molded on the front face thereof for horizontal distribution of image light, and horizontally running lenticules 24 molded on the rear surface thereof as a means of vertically distributing the image light. Hence there is no need for bulk or surface diffusion. The Fresnel lens 15 is molded on the front surface of the rear sheet 20. Here again, the green image projector 10, 12 is centrally located, and the red and blue image projectors 10, 12 are horizontally offset therefrom.

The horizontal light distribution achieved by the vertical lenticules 16 in FIGS. 1 through 4 may be recorded by means of a goniophotometer moving through a range of horizontal viewing angles. The results of such measurements, when the optical profile of the vertical lenticules 16 is of the type used in the prior art, is illustrated in FIG. 5. It is seen that each separate primary color image has a light distribution function (brightness in the y direction, versus horizontal viewing angle in the x direction) shaped like a bell curve having a peak value and falling off on either side of the peak. For the centrally located green image projector, the peak of the curve is located at a viewing angle of zero degrees, i.e. directly on the screen normal axis 18, and falls off symmetrically as the viewing angle increases in the positive and negative directions.

The light distribution curves for the red and blue image projectors are substantially the same but, because of their lateral offset from the vertical central plane of the screen, their peak values are located at viewing angles several degrees to the right and left respectively of the normal axis. This is an inherent consequence of the lateral offset of those two image projectors. The visible result is that a viewer on the one side of the screen normal axis will see an excess of blue in relation to green, and a deficit of red in relation to green, while a viewer on the opposite side of the axis will see precisely the opposite color imbalance.

In a commercially available screen whose goniophotometer readings are represented in FIG. 5, the red/green brightness ratio will vary from 0.4 to 1.31 over a horizontal viewing angle range of ±15.3 degrees. The blue/red ratio for the same screen would vary from 0.42 to 3.42 over the same range. These shifts in color balance are large enough so that they are readily apparent to the average observer.

Conventional optical solutions to this problem are not acceptable. The screen can be made to look satisfactory, to a viewer situated along the screen normal axis 18 at a selected fixed distance from the screen, simply by adjusting the brightness ratios of the primary color image projectors and using a Fresnel field lens 15 with a viewer conjugate located at that viewer position. Viewers at other positions, however, will see a color imbalance. In contrast, the present invention attempts to mitigate the color shift over a range of horizontal viewing angles and over a range of viewing distances.

The basic reason for the non-coincidence of the three curves in FIG. 5 is the fact that the red and blue image projectors direct their light upon the screen at different angles of incidence from the centrally located green image projector. For example, in FIGS. 1 and 2, note the optical axes 26 of the red and blue projectors. This causes the peak value of the exiting image light on the viewer side of the screen 14 to be shifted to one side or the other of the screen normal axis. For example, in FIG. 5 the peak 28 of the green light distribution curve falls on the zero degree viewing angle line 30, i.e. the screen normal axis 18 of FIGS. 1 and 3. But, the peak values 32 and 34 of the red and blue light distribution curves fall several degrees to the left and right of the zero degree line. That is to say that the peak values of the red and blue image light exit from the viewer side of the screen at an angle of several degrees to the left or right of screen normal.

Figure 6:
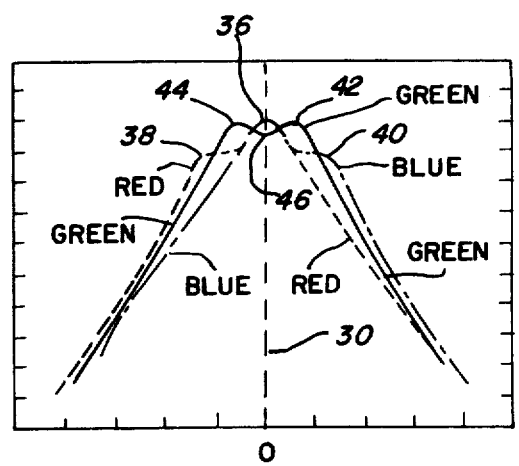
FIG. 6 is a similar plot showing the different color distribution obtained when the vertical lenticule profiles are designed in accordance with this invention.

In accordance with the present invention, the optical profile of each vertical lenticule 16 is designed so as to rotate the peak value of the exiting image light for each off-axis projector so that it coincides with the screen normal direction or zero degree viewing line 30. The resulting light distribution is seen in FIG. 6. Each of the three primary color distribution functions now has a double-humped shape. The red off-axis curve has its peak value 36 on the zero degree viewing angle line 30, and it also has a secondary peak or bulge 38 at a viewing angle of several degrees to the left. Similarly, the blue off-axis curve has its peak value 36 on the zero degree viewing angle line 30, and a secondary peak or bulge 40 several degrees to the right thereof. The green curve, or more generally the light distribution curve for the centrally located image projector, has two equal peaks 42 and 44 located on opposite sides of the zero degree viewing angle line 30, with a relative minimum 46 therebetween at zero degrees, i.e. exactly on the line 30. However, the green light distribution curve remains symmetrical about the zero degree line 30.

The resulting improvement in color balance is substantial. Theoretical calculations indicate that at viewing angles of plus or minus 15.3 degrees the red/green brightness ratio should be 0.89 to 1.07, while the blue/red ratio should be 0.83 to 1.20. Thus, some color imbalances remain for a viewing angle less than or greater than zero degrees, but the degree of color imbalance is quite a bit smaller.

Figure 7:
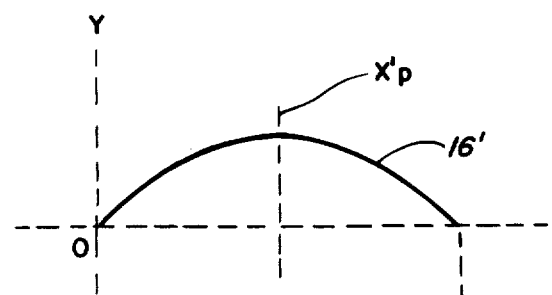
FIG. 7 is a plot of the profile of a single lenticule designed in accordance with the present invention.

FIG. 7 gives a rough qualitative idea of the horizontal cross-sectional profile of a single one of the vertical lenticules 16 which produce the results illustrated in FIG. 6. In this diagram the x direction is horizontal, and parallel to the forward face of the screen 14 in FIG. 1 or the forward face of sheet 22 in FIG. 3. The y direction is normal to the face of the screen 14 or sheet 22, with increasing values of y indicating greater distances forwardly from the screen or sheet. A value of $x=0$ represents one margin of the particular lenticule, and a value of $x=x_m$ represents the opposite margin of the particular lenticule. The curve 16' then indicates the cross-sectional shape or optical profile of the individual lenticule by giving its y value as a function of the corresponding x value. Furthermore, in a preferred embodiment of this invention, all of the vertical lenticules 16 in FIGS. 1-4 have the same optical profile indicated by FIG. 7.

In order to generate the curve 16' a particular lenticule location L (see FIG. 1) is chosen in the following manner. A line 48 is drawn from the optical center of one of the off-axis image projectors 10, 12, i.e. either the blue image projector or the red image projector. The line 48 extends in a direction normal to the screen 14; that is to say, parallel to the screen axis 18. Location L is then the location of the vertical lenticule 16 which is intersected by this line 48. In other words, the lenticule location L is one which is directly in front of one of the off-axis projectors, e.g. the red projector 10, 12.

Then, a lenticule profile 50 (see FIG. 8) is calculated for that particular lenticule location L by means of the variable profile procedure set forth in the copending patent application. It will be recalled that that lenticule design procedure varies the lenticule profile as a function of the lenticule's position between the center and edges of the screen. Thus, by specifying lenticule location L, one is directing the calculation of a particular lenticule profile, as opposed to other lenticule profiles which would be appropriate for other screen locations under the procedure set forth in the copending application.

The reason for selecting a screen location L which is directly in front of an off-axis (e.g. red) projector, is because that choice dictates an angle of incidence for image light emanating from the axial (green) projector which (together with the proper choice of viewer location) causes the variable profile lenticule design procedure of the copending patent application to calculate a lenticule profile which produces a horizontal distribution of green image light centered on a line normal to the screen at the chosen location L. Such a lenticule profile, when suitably modified as described below, and duplicated at all screen locations, will at every such location yield an image light distribution for each of the projectors, axial and off-axis alike, substantially centered on the screen normal direction. In the case of the off-axis projectors (red and blue) the distribution curve is not only substantially centered on screen normal, but also peaks in that direction. The axial (green) projector distribution curve has twin peaks on either side of screen normal, but is likewise centered thereon because of its symmetrical shape.

In contrast to the design procedure of the copending application, here the lenticule profile is calculated on the basis of the assumption that the viewer is also directly in front of the particular lenticule location L.

Since the procedure described in the copending application is set up for the input of data relating to a viewer located on the optical axis 18, the desired assumption is built into the present lenticule profile design procedure by assuming that the on-axis viewer is located at an infinite distance in front of the screen 14 or sheet 22. This is mathematically equivalent to making the viewing angle for that viewer (relative to lenticule location L) equal to zero degrees, so in practical effect it is the same as though the viewer were sitting directly in front of lenticule location L. This transformation has the effect of rotating the exit angle of the peak value of the red and blue light distribution for that particular lenticule into a normal attitude (i.e. zero degree exit angle), which accomplishes the design objective.

Once the lenticule location L is chosen, and the proper assumption as to viewer location is made, the procedure described in the copending application is followed and the lenticule profile 50 is calculated, using the same lenticule breadth as in FIG. 7 (that is, the left hand margin has a value of $x=0$ and the right hand margin has a value of $x=x_m$).

It is characteristic of this lenticule profile design procedure that for an off-axis lenticule location L the resulting lenticule profile 50 will be asymmetrical. That is to say, a line 52 which is drawn through the peak y value at $x=x_p$ will divide the lenticule profile 50 into a major fraction 54 and a minor fraction 56. The next step in the procedure is to discard the minor fraction 56 of lenticule profile 50, and then draw a curve 54' which is a mirror image of the major fraction 54, using the peak value line 52 as an axis of symmetry therebetween. Thus, from the initial lenticule profile 50, a second lenticule profile 54, 54' is generated which is symmetrical about the peak value line 52.

The curve 54, 54' is not usable in that form because it entails a larger lenticule breadth than the desired value $x_m$. Since a portion of 54 which constitutes more than half of the total profile 50 is doubled, the resulting breadth is a value $x'_m$ which substantially exceeds the desired value $x_m$. If this lenticule width were used, the result would be a screen with a substantially coarser lenticule pitch.

In order to avoid this, the desired lenticule profile 16' of FIG. 7 is calculated by making it proportional to the curve 54, 54', but reducing all of its dimensions so that the total profile width is reduced from $x'_m$ to $x_m$. The result is a smaller but similarly shaped lenticule profile which is symmetrical about a peak value of y occurring at a value $x=x'_p$.

The best method for carrying out this design procedure is to use the capabilities of a programmable digital computer to perform the necessary calculations. Preferably, but not necessarily, one would start off with a computer program called PROJ3ATAB, which was earlier disclosed in the copending application, to calculate lenticule profile 50. That computer program is disclosed again in an appendix to this specification, and the somewhat different input values used therewith are also indicated so that the proper lenticule location L and the proper viewer position assumptions are built into the calculation.

Figure 8:
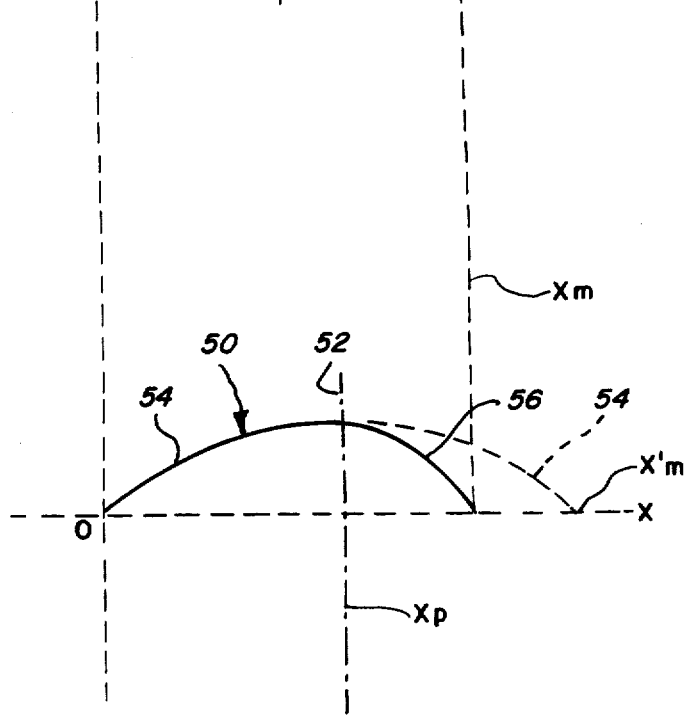
FIG. 8 is a plot of several profiles which illustrate the steps leading up to the design of the lenticule profile in FIG. 7.

Then a program called SYMMETRY, which is also disclosed in the appendix to this specification, may be used to mirror-image the major fraction 54 of profile 50, thus producing the oversized but correctly shaped profile 54, 54' seen in FIG. 8.

Another program called PERIOD, which is also disclosed in the appendix to this specification, may be used to reproportion the curve 54, 54' so that the margin-to-margin dimension $x_m'$ is reduced to $x_m$, and all other dimensions of the lenticule profile are correspondingly diminished, to produce the desired profile 16'.

A polynomial expression of the twentieth degree is then used to describe that profile. This polynomial is expressed in a data file called POLY209A, which is also disclosed in the appendix to this specification.

Finally, another computer program called TRACE 10, which is also disclosed in the appendix to the specification, may be used to calculate the expected light distribution curves (see FIG. 6) on the basis of the polynomial coefficients thereby developed.

The particular calculation which resulted in the curves of FIG. 6 was done on the basis of linear fall-offs in light distribution as a function of viewing angle; that is to say, a roughly triangular light distribution was selected. However, a skilled optical designer may wish to substitute other light distribution functions as desired, for example, cosine power functions, circular functions, exponential functions, or even various polynomial representations, depending upon the design objectives. These functions would be substituted in the subroutine of PROJ3ATAB called BDIST, starting at line 64 (see appendix).

It will now be appreciated that this method of image projection screen construction produces a screen which substantially reduces the change in color balance which occurs as a function of changes in viewing angle.

The described embodiments represent the preferred form of the invention, but alternative embodiments may be imagined which would come within the novel teachings herein. Accordingly, these embodiments are to be considered as merely illustrative, and not as limiting the scope of the following claims.

For example, it may be possible to employ a screen in which the vertical lenticules 16 of FIGS. 1 and 2 are replaced by a "fly's eye" array of substantially circular (rather than cylindrical) lenticules. In such an embodiment the cross-sectional profiles of the individual lenticules (with respect to a horizontal section plane) would continue to conform to the mathematical criteria described above. The cross-sectional profiles of the fly eye lenticules with respect to a vertical section plane could be designed to perform the vertical image light distribution function.

Yet another alternative is to use a single sheet as in FIGS. 1 and 2, with vertical lenticules 16 on the front side plus horizontal lenticules (such as lenticules 24 in FIGS. 3 and 4) superimposed thereover, on the same (front) side of the sheet, in crossing relationship. The optical profiles of these crossed lenticules would be as described above in connection with lenticules 16 and 24.

The invention claimed is:

1. An image projection screen defining a normal axis, and intended for use with a plurality of image projectors including an axial image projector, the optical axis of which is substantially coplanar with said normal axis, and at least one off-axis image projector the optical axis of which is displaced from the common plane of said coplanar axes in a transverse direction; said screen having a plurality of lenticules for distributing light from said image projectors over a viewing angle range extending across said transverse direction; each of said lenticules having respective light-directing cross-sectional profiles which distribute light from said image projectors across said transverse direction in a manner which varies as a function of said viewing angle; said light distribution differing as between said axial and said off-axis image projectors; wherein a selected plurality of said lenticules are formed so that said profiles thereof are substantially proportional to a third curve which may be derived by:

(a) selecting an asymmetric first curve having an off-center peak defined by the maximum value of the coordinate of said curve in said normal direction,
    (b) deriving an asymmetric second curve by selecting only a major portion of said first curve,
    (c) and deriving said third curve by symmetrically joining together said second curve and its mirror image;

whereby said selected lenticules have respective distributions of light from said off-axis projector with respective maximum values which coincide with respective lines that are substantially normal to said screen at the respective locations of said selected lenticules.

2. A screen as in claim 1 wherein the graph describing said distributions by any of said selected lenticules of light from said off-axis projector has a plurality of bulges therein, one of which exceeds any other and corresponds to said normally oriented maximum value.

3. A screen as in claim 1 wherein said profiles of said selected lenticules are also such that said distributions by said selected lenticules of light from said axial image projector is substantially symmetrical with respect to respective lines normal to said screen at the respective locations of said selected lenticules.

4. A screen as in claim 1 wherein each of said lenticules is selected to have substantially said same profile.

5. A screen as in claim 1 wherein said asymmetric first curve has a pair of opposed margins located a selected distance apart, said off-center peak being located located non-medially therebetween; and wherein said profiles of said selected lenticules are substantially congruent to a fourth curve derived by:

(d) scaling said third curve so that the distance between its opposed margins is substantially equal to the corresponding dimension of said first curve.

6. A screen as in claim 5 wherein:
    said major portion of said first curve extends from a dividing line, which passes substantially in said normal direction through said off-center peak, to that margin of said first curve which is more remote from said dividing line.

7. An image projection screen defining a normal axis, and intended for use with a plurality of image projectors including an axial image projector, the optical axis of which is in a common substantially vertical plane with said normal axis, and at least one off-axis image projector the optical axis of which is horizontally displaced from said common vertical plane; said screen having a plurality of lenticules for distributing light from said image projectors over a horizontal range of viewing angles; said lenticules having respective light-directing cross-sectional profiles, with respect to a substantially horizontal section plane, which distribute light from said image projectors in a manner which varies as a function of horizontal viewing angle; said light distribution differing as between said axial and said off-axis image projectors; wherein a selected plurality of said lenticules are formed so that said profiles thereof are substantially congruent to a fourth curve which may be derived by:
  (a) selecting an asymmetric first curve having a pair of opposed margins located a selected distance apart, and an off-center peak located non-medially therebetween and defined by the maximum value of the coordinate of said curve in said normal direction, said curve being adapted to produce a symmetric light distribution, as a function of transverse viewing angle, for light from said axial image projector, based on the assumptions that
    (i) the lenticule for which said profile is to be employed is located in said normal direction relative to said off-axis image projector,
    (ii) and the viewer is effectively located in said normal direction relative to said lenticule;
  (b) deriving an asymmetric second curve by selecting only a major portion of said first curve, which major portion extends from a dividing line passing substantially in said normal direction through said off-center peak, to that margin of said first curve which is more remote from said dividing line;
  (c) deriving a symmetric third curve by joining together said second curve and its mirror image at said dividing line;
  (d) and deriving said fourth curve by scaling said third curve so that the distance between its opposed margins is substantially equal to the corresponding dimension of said first curve.

8. An image projection screen defining a normal axis, and intended for use with a plurality of image projectors including an axial image projector, the optical axis of which is substantially coplanar with said normal axis, and at least one off-axis image projector the optical axis of which is displaced from the common plane of said coplanar axes in a transverse direction; said screen having a plurality of lenticules for distributing light from said image projectors over a viewing angle range extending across said transverse direction; said lenticules having respective light-directing cross-sectional profiles, with respect to a transverse section plane, which distribute light from said image projectors in a manner which varies as a function of said transverse viewing angle; said light distribution differing as between said axial and said off-axis image projectors; wherein a selected plurality of said lenticules are formed as that said profiles thereof are substantially proportional to a third curve which may be derived by:
  (a) selecting an asymmetric first lenticule cross-sectional curve for a screen location which has the same transverse coordinate as said off-axis projector, said curve being adapted to distribute substantially equal amounts of image light from said respective projectors to a viewer effectively located at said same transverse coordinate as said off-axis projector;
  (b) deriving an asymmetric second curve by selecting only a major portion of said first curve;
  (c) and deriving said third curve by symmetrically joining together said second curve and its mirror image.

9. An image projection screen defining a normal axis, and intended for use with a plurality of image projectors including an axial image projector, the optical axis of which is substantially coplanar with said normal axis, and at least one off-axis image projector the optical axis of which is displaced from the common plane of said coplanar axes in a transverse direction; said screen having a plurality of lenticules for distributing light from said image projectors over a viewing angle range extending across said transverse direction; said lenticules having respective light-directing cross-sectional profiles, with respect to a transverse section plane, which distribute light from said image projectors in a manner which varies as a function of said transverse viewing angle; said light distribution differing as between said axial and said off-axis image projectors; wherein a selected plurality of said lenticules are formed so that said profiles thereof are substantially proportional to a third curve which may be derived by:
  (a) selecting an asymmetric first lenticule cross-sectional curve for a screen location which has the same transverse coordinate as said off-axis projector, said curve being adapted to distribute substantially equal amounts of image light from said respective projectors to a viewer located on said normal axis at an infinite distance from said screen;
  (b) deriving an asymmetric second curve by selecting only a major portion of said first curve;
  (c) and deriving said third curve by symmetrically joining together said second curve and its mirror image.

* * * * *